US011391239B2

(12) United States Patent
Lin

(10) Patent No.: US 11,391,239 B2
(45) Date of Patent: Jul. 19, 2022

(54) FLYING VEHICLE AND PROPULSION DEVICE THEREOF

(71) Applicant: Yao-Chang Lin, Hsinchu (TW)

(72) Inventor: Yao-Chang Lin, Hsinchu (TW)

( * ) Notice: Subject to any disclaimer, the term of this patent is extended or adjusted under 35 U.S.C. 154(b) by 206 days.

(21) Appl. No.: 16/746,965

(22) Filed: Jan. 20, 2020

(65) Prior Publication Data

US 2021/0095616 A1 Apr. 1, 2021

(30) Foreign Application Priority Data

Sep. 30, 2019 (TW) ................................. 108135398

(51) Int. Cl.
| | |
|---|---|
| *F02K 1/00* | (2006.01) |
| *B64D 33/04* | (2006.01) |
| *B64D 33/02* | (2006.01) |
| *B64D 27/18* | (2006.01) |

(52) U.S. Cl.
CPC .............. *F02K 1/002* (2013.01); *B64D 27/18* (2013.01); *B64D 33/02* (2013.01); *B64D 33/04* (2013.01)

(58) Field of Classification Search
CPC ........ B64C 15/02; B64D 27/18; B64D 33/02; B64D 33/04; F02K 1/002; F02K 1/004; F02K 1/40; F02K 1/008; F02K 9/84; F02K 9/90; F05D 2250/411
See application file for complete search history.

(56) References Cited

U.S. PATENT DOCUMENTS

| | | | | |
|---|---|---|---|---|
| 3,689,011 A | * | 9/1972 | Torelli ................... | B64C 39/06 244/12.2 |
| 3,912,202 A | * | 10/1975 | Jenkins ................... | F02K 1/002 244/52 |
| 4,508,270 A | * | 4/1985 | Joubert ................... | F02K 1/008 239/265.35 |
| 4,993,638 A | * | 2/1991 | Lardellier ............... | B64C 15/02 239/265.35 |
| 5,524,827 A | * | 6/1996 | Znamensky ............ | F02K 1/002 239/265.33 |

* cited by examiner

*Primary Examiner* — Scott J Walthour

(57) ABSTRACT

A propulsion device includes a propulsion body and a diversion assembly. The propulsion body includes a propulsion system and a housing accommodating the propulsion system. The housing has an air-intake opening and an air-discharge opening respectively on two opposite sides of the propulsion system. The diversion assembly includes first and second diversion annular sheets. The first diversion annular sheet is disposed outside the air-discharge opening of the housing and having a surrounding center. The first diversion annular sheet is swung relative to the air discharge opening by a first axis passing through the surrounding center. The second diversion annular sheet is disposed outside the air-discharge opening of the housing and concentrically disposed with the first diversion annular sheet. The second diversion annular sheet is swung relative to the air-discharge opening by a second axis passing through the surrounding center, and first axis intersects the second axis.

14 Claims, 3 Drawing Sheets

100

FLYING VEHICLE AND PROPULSION DEVICE THEREOF

FIELD OF THE INVENTION

The present invention relates to a flying vehicle and a propulsion device thereof, and more particularly to a propulsion device having a diversion structure and a flying vehicle having the propulsion.

BACKGROUND OF THE INVENTION

Some light flying vehicles are equipped with turbo thrusters on their wings to fly in the air by a jet stream. The direction of the jet stream can be changed by rotating the entire turbine propeller, so that the flight vehicle can perform an action in the air that changes direction of flight, such as turning, climbing or descending. However, a turbo thruster typically has a large mass such that turning the turbine thruster requires a greater amount of force. In addition, the mechanical structure that rotates the entire turbine thruster is typically quite complex. In this way, the energy consumption of a flying vehicle may be increased.

SUMMARY OF THE INVENTION

The present invention provides a flying vehicle capable of decreasing energy consumption and a propulsion device thereof.

The present invention provides a propulsion device including a propulsion body and a diversion assembly. The propulsion body includes a propulsion system and a housing accommodating the propulsion system, wherein the housing has an air-intake opening and an air-discharge opening respectively on two opposite sides of the propulsion system. The diversion assembly includes a first diversion annular sheet and a second diversion annular sheet. The first diversion annular sheet is disposed outside the air-discharge opening of the housing and having a surrounding center, wherein the first diversion annular sheet is swung relative to the air-discharge opening by a first axis passing through the surrounding center. The second diversion annular sheet is disposed outside the air-discharge opening of the housing and concentrically disposed with the first diversion annular sheet, wherein the second diversion annular sheet is swung relative to the air-discharge opening by a second axis passing through the surrounding center, and first axis intersects the second axis.

The present invention provides a flying vehicle including a vehicle body and a wing. The wing is disposed on top of the vehicle body. Two sides of the wing are respectively connected by an aforesaid propulsion device.

In an embodiment of the present invention, the first diversion annular sheet includes two first pivot portions opposite to each other, the housing includes two second pivot portions opposite to each other adjacent to the air-discharge opening, the two first pivot portions are pivotally connected to the two second pivot portions respectively, and the propulsion device further includes two wire bodies respectively connecting two points of the first diversion annular sheet to the housing to limit a swing range of the first diversion annular sheet.

In an embodiment of the present invention, the air-discharge opening has a circular shape, and a size of the air-discharge opening is not less than a size of the first diversion annular sheet.

In an embodiment of the present invention, the propulsion device further includes two connecting rods disposed along the second axis, wherein two ends of each of the connecting rods are respectively connected to an inner wall of the first diversion annular sheet and pivotally connected to the second diversion annular sheet.

In an embodiment of the present invention, the air-intake opening and the air-discharge opening both have a circular shape, the air-intake opening is larger than the air-discharge opening, and the housing comprises a first portion having a cross-sectional area corresponding to the air-intake opening and a second portion having a cross-sectional area tapered from the air-intake opening to the air-discharge opening.

In an embodiment of the present invention, the second diversion annular sheet further includes a supporting frame including two ribs intersecting with each other at the surrounding center, and two ends of each of the ribs are connected to an inner wall of the second diversion annular sheet.

In an embodiment of the present invention, the propulsion system includes a propeller exposed to the air-intake opening.

The propulsion device of the flying vehicle of the embodiments of the present invention includes a swingable first diversion annular sheet and a swingable second diversion annular sheet. Therefore, the flying vehicle can fly toward a predetermined direction as the swing of the first diversion annular sheet and the second diversion annular sheet, and the jet stream can be used more efficiently when the direction of the flying vehicle is changed, thereby decreasing energy consumption.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
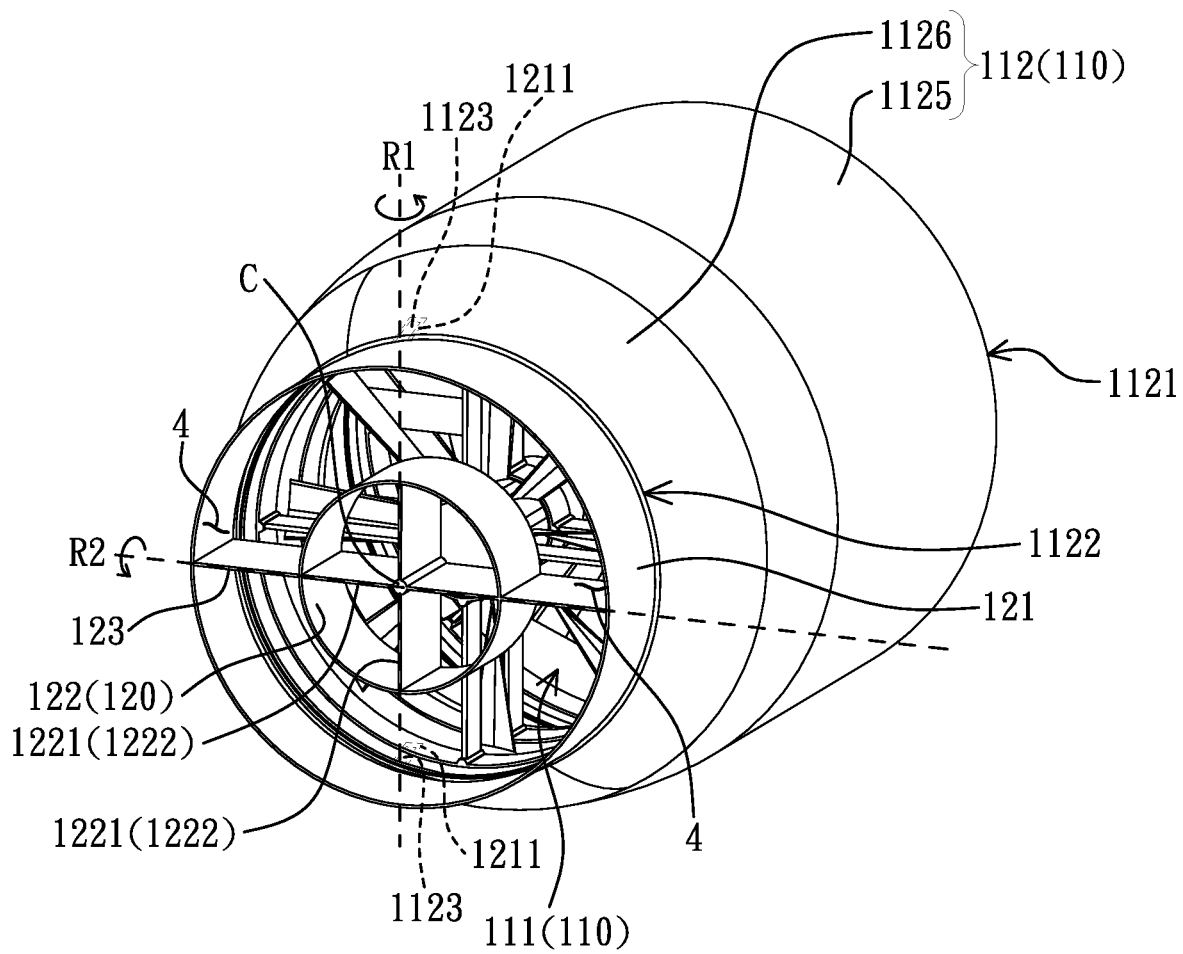
FIG. 1A is a three-dimensional schematic diagram of a propulsion device of an embodiment of the present invention.
Figure 1B:
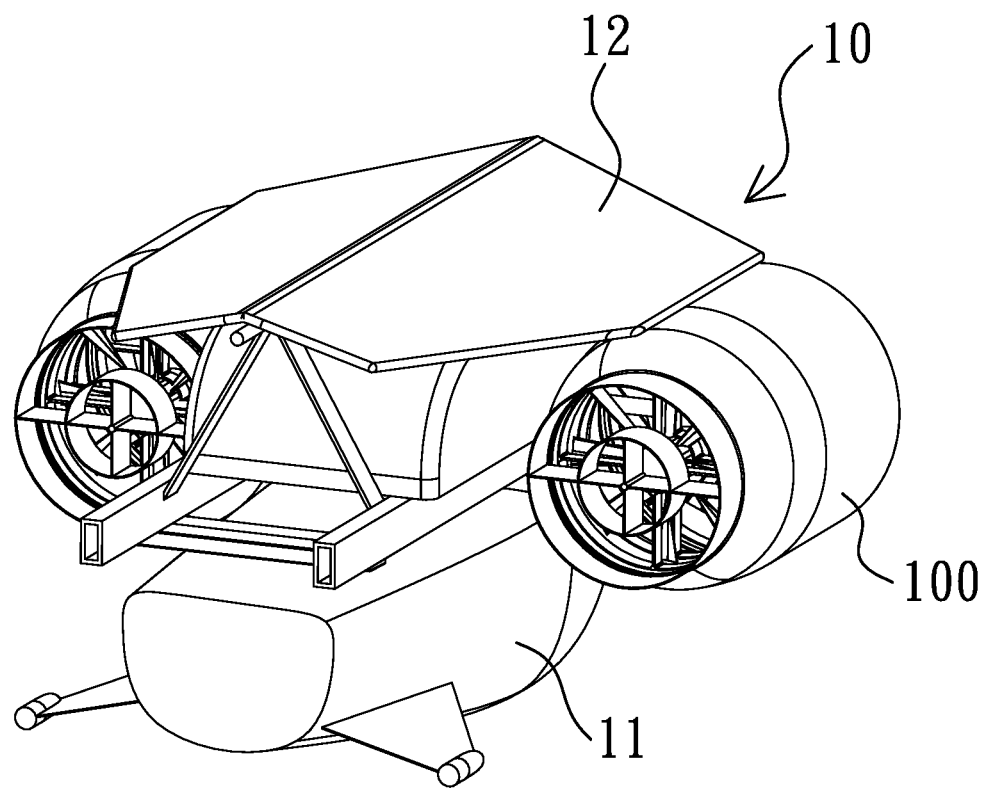
FIGS. 1B and 1C are respectively three-dimensional schematic diagrams with different view angle of a flying vehicle equipped with the propulsion device of FIG. 1A.
Figure 1C:
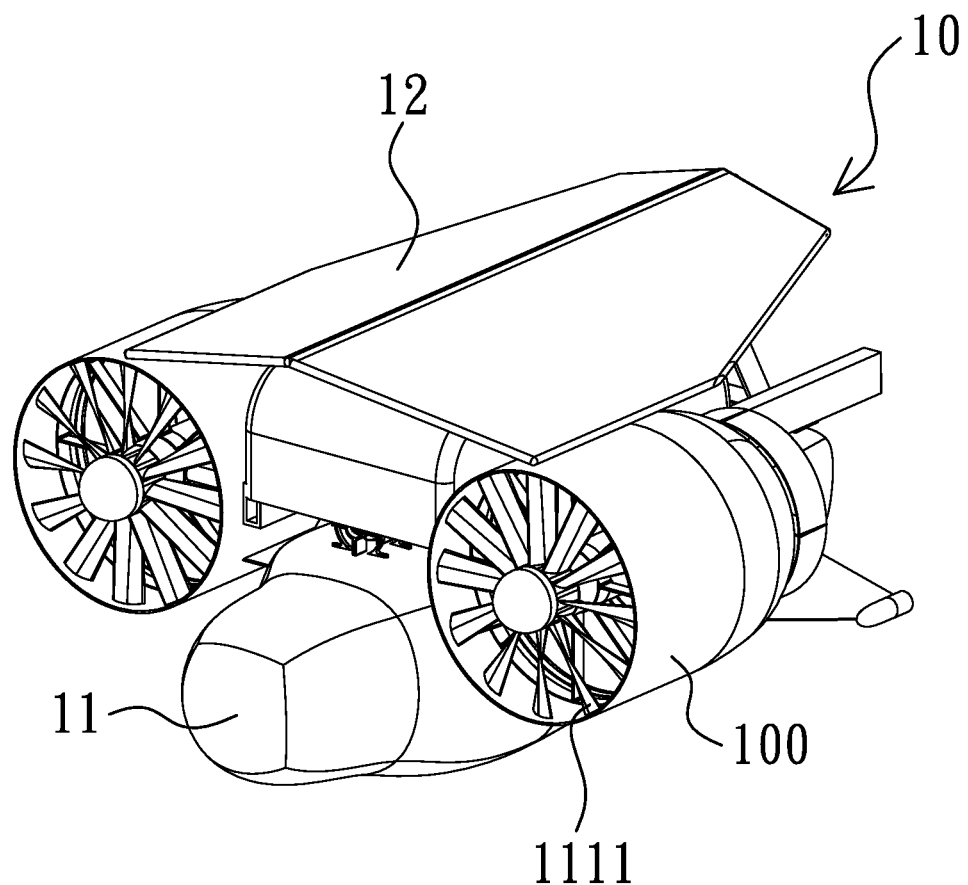

FIG. 1A is a three-dimensional schematic diagram of a propulsion device of an embodiment of the present invention. FIGS. 1B and 1C are respectively three-dimensional schematic diagrams of a flying vehicle equipped with the propulsion device of FIG. 1A with different view angles. Please refer to FIGS. 1A to 1C, the propulsion device 100 of the present embodiment includes a propulsion body 110 and a diversion assembly 120. The propulsion body 110 includes a propulsion system 111 and a housing 112 accommodating the propulsion system 111. The housing 112 has an air-intake opening 1121 and an air-discharge opening 1122 respectively on two opposite sides of the propulsion system 111.

The diversion assembly 120 includes a first diversion annular sheet 121 and a second diversion annular sheet 122. The first diversion annular sheet 121 is disposed outside the air-discharge opening 1122 of the housing 112 and has a surrounding center C. The first diversion annular sheet 121 is swung relative to the air-discharge opening 1122 by a first axis R1 passing through the surrounding center C. The second diversion annular sheet 122 is also disposed outside the air-discharge opening 1122 of the housing 112 and concentrically disposed with the first diversion annular sheet 121. The second diversion annular sheet 122 is swung relative to the air-discharge opening 1122 by a second axis R2 passing through the surrounding center C. In the present embodiment, the first axis R1 intersects perpendicularly to the second axis R2, but is not limited thereto.

The flying vehicle 10 of the present embodiment includes a vehicle body 11 and a wing 12. The wing 12 is disposed on top of the vehicle body 11. Each of two side of the wing 12 is connected to a propulsion device 100. The propulsion system 111 may include a propeller 1111 exposed to the air-intake opening 1121 and a turbine (not shown) disposed in the housing 112 to drive the propeller 1111 to rotate, thereby a jet stream can be formed by inhaling air from the air-intake opening 1121 and then discharging air from the air-discharge opening 1122.

In the present embodiment, the air-intake opening 1121 and the air-discharge opening 1122 both have a circular shape, and the air-intake opening 1121 is larger than the air-discharge opening 1122. The housing 112 includes a first portion 1125 having a cross-sectional area corresponding to the air-intake opening 1121 and a second portion 1126 having a cross-sectional area tapered from the air-intake opening 1121 to the air-discharge opening 1122. The tapered structure is advantageous for forming a high speed jet stream.

The first diversion annular sheet 121 is swung relative to the housing 112 based on inertia when the flying vehicle 10 turns horizontally in the sky. The second diversion annular sheet 122 is also swung relative to the housing 112 based on inertia when the flying vehicle 10 climbs or descends in the sky. The first diversion annular sheet 121 and the second diversion annular sheet 122 are swung at the same time when the flying vehicle 10 turns and climbs/descends at the same time.

In the present embodiment, the first diversion annular sheet 121 includes two first pivot portions 1211 opposite to each other, and the housing 112 includes two second pivot portions 1123 opposite to each other and adjacent to the air-discharge opening 1122. The two first pivot portions 1211 are pivotally connected to the two second pivot portions 1123 respectively. In the present embodiment, the first pivot portion 1211 is a pin and the second pivot portion 1123 is a hole corresponding to the pin, but are not limited thereto. The structures of the first pivot portion 1211 and the second pivot portion 1123 can be interchanged or can be other equivalent structures.

In the present embodiment, the air-discharge opening 1122 has a circular shape, and a size of the air-discharge opening 1122 is not less than a size of the first diversion annular sheet 121 to provide a swing space to the first diversion annular sheet 121. In addition, the propulsion device 100 can further include two wire bodies 4 respectively connecting two points of the first diversion annular sheet 121 to the housing 112 to limit a swing range of the first diversion annular sheet 121.

In the present embodiment, the diversion assembly 120 can further include two connecting rods 123 disposed along the first axis R1. Two ends of each of the connecting rods 123 are respectively connected to an inner wall of the first diversion annular sheet 121 and pivotally connected to the second diversion annular sheet 122. The pivot connection between the connecting rod 123 and the second diversion annular sheet 122 can be similar to the pivot connection between the first diversion annular sheet 121 and the housing 112, and therefore no redundant detail is to be given herein.

In the present embodiment, the second diversion annular sheet 122 can further include a supporting frame 1221 for reinforcing structure strength. The supporting frame 1221 may include two ribs 1222 intersecting with each other at the surrounding center C. Two ends of each of the ribs 1222 are connected to an inner wall of the second diversion annular sheet 122. In the present embodiment, the two ribs 1222 are respectively disposed along the first axis R1 and the second axis R2, but are not limited thereto.

The propulsion device of the flying vehicle of the embodiments of the present invention includes a swingable first diversion annular sheet and a swingable second diversion annular sheet. Therefore, the flying vehicle can fly toward a predetermined direction as the swing of the first diversion annular sheet and the second diversion annular sheet and the jet stream can be used more efficiently when the direction of the flying vehicle is changed, thereby decreasing energy consumption.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A propulsion device adapted to a flying vehicle, comprising:
   a propulsion body comprising a propulsion system and a housing accommodating the propulsion system, wherein the housing has an air-intake opening and an air-discharge opening, respectively, on two opposite sides of the propulsion system; and
   a diversion assembly, comprising:
      a first diversion annular sheet, disposed outside the air-discharge opening of the housing and having a surrounding center, wherein the first diversion annular sheet is swung relative to the air-discharge opening by a first axis passing through the surrounding center; and
      a second diversion annular sheet, disposed outside the air-discharge opening of the housing and concentrically disposed with the first diversion annular sheet, wherein the second diversion annular sheet is swung relative to the air-discharge opening by a second axis passing through the surrounding center, and the first axis intersects the second axis at an angle that is greater than zero degrees and less than or equal to ninety degrees.

2. The propulsion device according to claim 1, wherein the first diversion annular sheet comprises two first pivot portions opposite to each other, the housing comprises two second pivot portions opposite to each other adjacent to the air-discharge opening, the two first pivot portions are pivotally connected to the two second pivot portions respectively, and the propulsion device further comprises two wire bodies respectively connecting two points of the first diversion annular sheet to the housing to limit a swing range of the first diversion annular sheet.

3. The propulsion device according to claim 1, wherein the air-discharge opening has a circular shape, and a size of the air-discharge opening is not less than a size of the first diversion annular sheet.

4. The propulsion device according to claim 1, further comprising two connecting rods disposed along the first axis, wherein two ends of each of the two connecting rods are respectively connected to an inner wall of the first diversion annular sheet and pivotally connected to the second diversion annular sheet.

5. The propulsion device according to claim 1, wherein the air-intake opening and the air-discharge opening both have a circular shape, the air-intake opening is larger than the air-discharge opening, and the housing comprises a first portion having a cross-sectional area corresponding to the air-intake opening and a second portion having a cross-sectional area tapered from the air-intake opening to the air-discharge opening.

6. The propulsion device according to claim 1, wherein the second diversion annular sheet further comprises a supporting frame comprising two ribs intersecting with each other at the surrounding center, and two ends of each of the two ribs are connected to an inner wall of the second diversion annular sheet.

7. The propulsion device according to claim 1, wherein the propulsion system comprises a propeller exposed to the air-intake opening.

8. A flying vehicle, comprising:
a vehicle body; and
a wing disposed on top of the vehicle body, the wing having two sides, wherein each of the two sides of the wing is connected to a propulsion device, each propulsion device comprising:
   a propulsion body comprising a propulsion system and a housing accommodating the propulsion system, wherein the housing has an air-intake opening and an air-discharge opening, respectively, on two opposite sides of the propulsion system; and
   a diversion assembly, comprising:
      a first diversion annular sheet, disposed outside the air-discharge opening of the housing and having a surrounding center, wherein the first diversion annular sheet is swung relative to the air-discharge opening by a first axis passing through the surrounding center; and
      a second diversion annular sheet, disposed outside the air-discharge opening of the housing and concentrically disposed with the first diversion annular sheet, wherein the second diversion annular sheet is swung relative to the air-discharge opening by a second axis passing through the surrounding center, and the first axis intersects the second axis at an angle that is greater than zero degrees and less than or equal to ninety degrees.

9. The flying vehicle according to claim 8, wherein the first diversion annular sheet comprises two first pivot portions opposite to each other, the housing comprises two second pivot portions opposite to each other adjacent to the air-discharge opening, the two first pivot portions are pivotally connected to the two second pivot portions respectively, and each propulsion device further comprises two wire bodies respectively connecting two points of the first diversion annular sheet to the housing to limit a swing range of the first diversion annular sheet.

10. The flying vehicle according to claim 8, wherein the air-discharge opening has a circular shape, and a size of the air-discharge opening is not less than a size of the first diversion annular sheet.

11. The flying vehicle according to claim 8, wherein each propulsion device further comprises two connecting rods disposed along the second axis, wherein two ends of each of the two connecting rods are respectively connected to an inner wall of the first diversion annular sheet and pivotally connected to the second diversion annular sheet.

12. The flying vehicle according to claim 8, wherein the air-intake opening and the air-discharge opening both have a circular shape, the air-intake opening is larger than the air-discharge opening, and the housing comprises a first portion having a cross-sectional area corresponding to the air-intake opening and a second portion having a cross-sectional area tapered from the air-intake opening to the air-discharge opening.

13. The flying vehicle according to claim 8, wherein the second diversion annular sheet further comprises a supporting frame comprising two ribs intersecting with each other at the surrounding center, and two ends of each of the two ribs are connected to an inner wall of the second diversion annular sheet.

14. The flying vehicle according to claim 8, wherein each propulsion system comprises a propeller exposed to the air-intake opening.

* * * * *